(12) United States Patent
Ito et al.

(10) Patent No.: US 10,875,376 B2
(45) Date of Patent: Dec. 29, 2020

(54) AIR SUSPENSION SYSTEM

(71) Applicant: HITACHI AUTOMOTIVE SYSTEMS, LTD., Ibaraki (JP)

(72) Inventors: Tsutomu Ito, Sagamihara (JP); Kan Kobayashi, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 41 days.

(21) Appl. No.: 16/320,367

(22) PCT Filed: Jul. 24, 2017

(86) PCT No.: PCT/JP2017/026597
§ 371 (c)(1),
(2) Date: Jan. 24, 2019

(87) PCT Pub. No.: WO2018/021207
PCT Pub. Date: Feb. 1, 2018

(65) Prior Publication Data
US 2019/0263212 A1    Aug. 29, 2019

(30) Foreign Application Priority Data

Jul. 27, 2016    (JP) .................................. 2016-147384

(51) Int. Cl.
*B60G 17/056*    (2006.01)
*B01D 53/26*    (2006.01)
*B60G 17/052*    (2006.01)

(52) U.S. Cl.
CPC ......... *B60G 17/0565* (2013.01); *B01D 53/26* (2013.01); *B01D 53/261* (2013.01);
(Continued)

(58) Field of Classification Search
None
See application file for complete search history.

(56) References Cited

U.S. PATENT DOCUMENTS

2002/0136645 A1    9/2002 Folchert et al.
2019/0084365 A1*   3/2019 Oishi ................... B60G 17/052
(Continued)

FOREIGN PATENT DOCUMENTS

| JP | 58-098210 | 7/1983 |
| JP | 58-124311 | 8/1983 |

(Continued)

OTHER PUBLICATIONS

International Search Report dated Sep. 5, 2017 in International (PCT) Application No. PCT/JP2017/026597.

*Primary Examiner* — Drew J Brown
(74) *Attorney, Agent, or Firm* — Wenderoth Lind & Ponack, L.L.P.

(57) ABSTRACT

An air suspension system includes air suspensions (1, 2) performing vehicle height adjustment in response to supply and discharge of air, a compressor (3) compressing air, a tank (4) storing compressed air, a first passage (6) connecting between the delivery side of the compressor and the tank, and a second passage (7) connecting between the delivery side of the compressor and the air suspensions. A first dryer (10) is provided in the middle of the first passage to dry air flowing through the first passage. A second dryer (11) is provided in the middle of the second passage to dry air flowing through the second passage. Thus, compressed air generated from ambient air sucked in by the compressor can be dried by the second dryer and supplied directly into the air chambers of the air suspensions.

10 Claims, 7 Drawing Sheets

(52) U.S. Cl.
CPC ......... *B60G 17/052* (2013.01); *B60G 17/056* (2013.01); *B60G 2202/152* (2013.01); *B60G 2500/302* (2013.01); *B60G 2600/66* (2013.01)

(56) References Cited

U.S. PATENT DOCUMENTS

| | | | | |
|---|---|---|---|---|
| 2019/0100069 | A1* | 4/2019 | Yoshida | B60G 17/0565 |
| 2019/0100070 | A1* | 4/2019 | Ito | B60G 17/0525 |
| 2019/0111753 | A1* | 4/2019 | Reuter | B60G 17/0565 |
| 2019/0149029 | A1* | 5/2019 | Kawai | F04B 35/04 |
| | | | | 417/416 |
| 2019/0201840 | A1* | 7/2019 | Kawai | B01D 53/0454 |
| 2019/0275854 | A1* | 9/2019 | Kobayashi | B60G 17/052 |

FOREIGN PATENT DOCUMENTS

| | | |
|---|---|---|
| JP | 60-186217 | 12/1985 |
| JP | 60-186218 | 12/1985 |
| JP | 2002-337531 | 11/2002 |
| JP | 2015-105020 | 6/2015 |

\* cited by examiner

AIR SUSPENSION SYSTEM

TECHNICAL FIELD

The present invention relates to an air suspension system installed in a vehicle, for example, a four-wheeled automobile, to perform vehicle height adjustment using air compressed by a compressor.

BACKGROUND ART

Vehicles such as four-wheeled automobiles are generally equipped with an air suspension system for performing vehicle height adjustment. The air suspension system has an air suspension performing vehicle height adjustment in response to supply and discharge of air. The air suspension system further has a compressor compressing air to be supplied to the air suspension, and a tank storing air compressed by the compressor.

There is an air suspension system known as a closed-circuit type air suspension system (closed system). The closed-circuit type air suspension system is configured such that compressed air stored in a tank is supplied to an air suspension through a compressor. The closed-circuit type air suspension system is capable of increasing the amount of compressed air delivered from the compressor and hence capable of reducing the time required for vehicle height adjustment by the air suspension (for example, see Patent Literature 1).

CITATION LIST

Patent Literature

PTL 1: Japanese Patent Application Laid-Open Publication No. 2002-337531

SUMMARY OF INVENTION

Technical Problem

The above-described closed-circuit type air suspension system suffers, however, from the problem that the system function may be degraded due to air leakage in the system occurring when the vehicle is not used for a long period of time, for example.

More specifically, if vehicle height adjustment is performed in a state where there is a shortage of air in the system, the compressed air in the tank may run short during vehicle height adjustment. In such a case, the supply of compressed air to the air suspension is stopped, and ambient air is sucked in and compressed by the compressor and filled into the tank as compressed air. After the completion of filling the tank with compressed air, the compressed air in the tank is supplied to the air suspension through the compressor again. Consequently, a great deal of time is required for a vehicle height adjusting operation to raise the vehicle height.

An object of the present invention is to provide an air suspension system configured to be capable of reducing the time required for vehicle height adjustment even when there is a shortage of air in the tank.

Solution to Problem

An air suspension system according to one embodiment of the present invention includes the following constituent elements: an air suspension interposed between a vehicle body and an axle to perform vehicle height adjustment in response to supply and discharge of air; a compressor compressing air; a tank storing air compressed by the compressor; a first passage connecting between the delivery side of the compressor and the tank; a second passage connecting between the delivery side of the compressor and the air suspension; a first dryer drying air flowing through the first passage; and a second dryer drying air flowing through the second passage.

According to one embodiment of the present invention, ambient air is sucked in and compressed by the compressor, and the compressed air is dried by the second dryer and supplied directly to the air suspension through the second passage. Accordingly, the closed-circuit type air suspension system can perform vehicle height adjustment rapidly even when the compressed air in the tank runs short during the vehicle height adjustment, and it is possible to reduce the time required for vehicle height adjustment.

DESCRIPTION OF EMBODIMENTS

Figure 1:
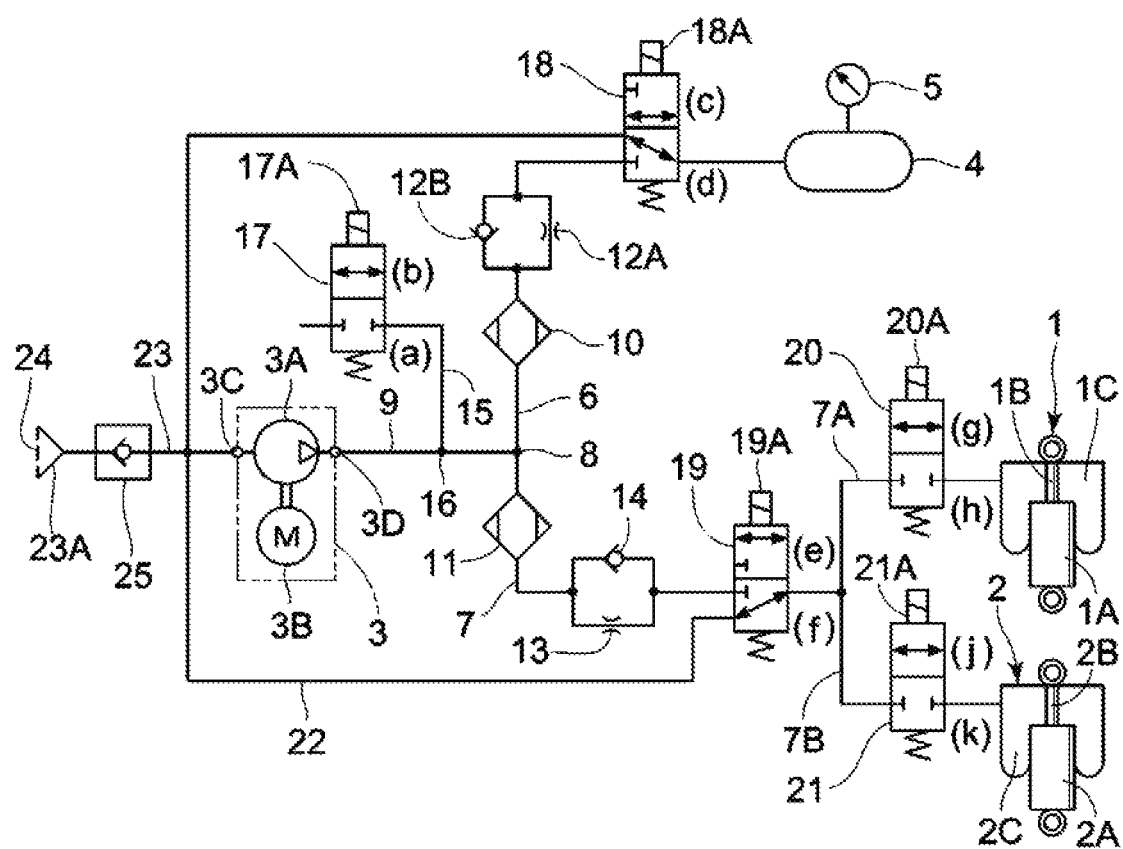
FIG. 1 is a circuit configuration diagram showing an air suspension system according to an embodiment of the present invention.

An air suspension system according to an embodiment of the present invention will be explained below in detail with reference to FIGS. 1 to 7. The air suspension system according to this embodiment constitutes a closed-circuit type air suspension system (closed system). The air suspension system is configured such that air discharged from air suspensions 1 and 2 is compressed by a compressor 3 and stored in a tank 4, and the compressed air stored in the tank 4 is supplied to the air suspensions 1 and 2.

The air suspensions 1 and 2 are installed in a vehicle, for example, a passenger automobile. The air suspensions 1 and 2 are each provided between an axle and vehicle body (both not shown) to perform vehicle height adjustment in response to the supply and discharge of air. It should be noted that a four-wheeled automobile is usually provided with a total of four air suspensions: two on the front wheel side, and two on the rear wheel side. In this embodiment, however, only two air suspensions 1 and 2 are illustrated for the sake of simplifying the description.

The air suspension 1 has an air chamber 1C formed between a cylinder 1A and a projecting end of a piston rod 1B. The air chamber 1C is connected to a branched second passage 7A (described later). Similarly, the air suspension 2 has an air chamber 2C formed between a cylinder 2A and a projecting end of a piston rod 2B. The air chamber 2C is connected to a branched second passage 7B (described later).

The compressor 3 compresses air to be supplied to the air suspensions 1 and 2. The compressor 3 comprises a compressor body 3A, and an electric rotary motor 3B driving the compressor body 3A. The compressor 3 has a suction port 3C connected with a return passage 22 and suction passage 23 (described later). Meanwhile, a delivery port 3D of the compressor 3 is connected with a first passage 6 and second passage 7 (described later). The electric rotary motor 3B may be replaced with a linear motor.

The tank 4 stores air compressed by the compressor 3. Compressed air delivered from the delivery port 3D of the compressor 3 is stored in the tank 4 through the later-described first passage 6. The tank 4 is provided with a pressure gauge 5. The pressure gauge 5 detects the pressure in the tank 4.

The first passage 6 connects between the delivery port 3D of the compressor 3, which is the delivery side thereof, and the tank 4. Compressed air delivered from the compressor 3 is led to the tank 4 through the first passage 6. The first passage 6 is provided in the middle thereof with a first dryer 10, first orifice 12A, first supply-discharge switching valve 18, and so forth (described later).

The second passage 7 connects between the delivery port 3D of the compressor 3 and the air chambers 1C and 2C of the air suspensions 1 and 2. Compressed air delivered from the compressor 3 is led to the air suspensions 1 and 2 through the second passage 7. The second passage 7 is provided in the middle thereof with a second dryer 11, second orifice 13, check valve 14, second supply-discharge switching valve 19, and so forth (described later).

The second passage 7 is branched into a plurality of branched second passages 7A and 7B between the second supply-discharge switching valve 19 and the air suspensions 1 and 2. One branched second passage 7A is connected to the air chamber 1C of the air suspension 1, and the other branched second passage 7B is connected to the air chamber 2C of the air suspension 2.

The first passage 6 and the second passage 7 are connected to each other at a junction 8. A section of the first passage 6 between the compressor 3 and the junction 8 and a section of the second passage 7 between the compressor 3 and the junction 8 constitute a single common passage 9. Accordingly, compressed air from the compressor 3 is delivered to the common passage 9 from the delivery port 3D. The compressed air delivered to the common passage 9 is led from the junction 8 either to the tank 4 through the first passage 6 or to the air suspensions 1 and 2 through the second passage 7.

Figure 2:
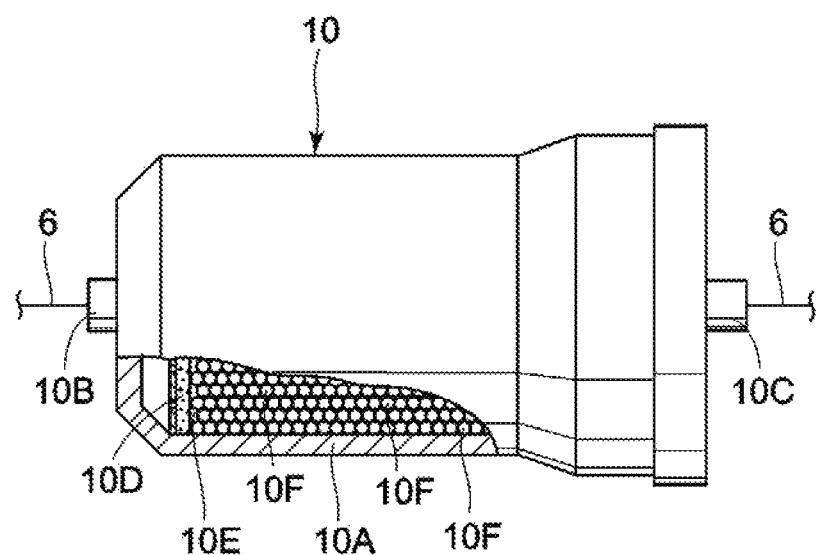
FIG. 2 is a partially cutaway external view of a first dryer.

The first dryer 10 is provided in the middle of the first passage 6 between the junction 8 of the first and second passages 6 and 7 and the tank 4. The first dryer 10 has, as shown in FIG. 2, a casing 10A having a cylindrical shape, for example. The casing 10A is provided at both ends in the longitudinal direction thereof with vents 10B and 10C which are connected to the first passage 6. The casing 10A has an adsorption chamber 10E defined therein by a filter element 10D and so forth. The adsorption chamber 10E is filled therein with an adsorbent 10F, e.g. silica gel. The first dryer 10 allows the adsorbent 10F to adsorb water from compressed air delivered from the compressor 3, thereby drying air flowing through the first passage 6. Accordingly, compressed air dried by the first dryer 10 is stored in the tank 4.

The second dryer 11 is provided in the middle of the second passage 7 between the junction 8 of the first and second passages 6 and 7 and the air suspensions 1 and 2. The second dryer 11 is also constructed by including a casing, vents, filter element, adsorption chamber, adsorbent, and so forth (none of them shown), in the same way as the first dryer 10. The second dryer 11 allows the adsorbent to adsorb water from compressed air from the compressor 3, thereby drying air flowing through the second passage 7. Accordingly, compressed air dried by the second dryer 11 is stored in the air chambers 1C and 2C of the air suspensions 1 and 2.

In this case, the adsorption capacity of the first dryer 10 to adsorb water from the air is set higher than the adsorption capacity of the second dryer 11. Specifically, the adsorbent 10F to be filled in the first dryer 10 is prepared by using a material having a higher water adsorbing capability (adsorbability) than that of the material constituting the adsorbent filled in the second dryer 11. Accordingly, the first dryer 10 is higher in water adsorption capacity than the second dryer 11 even if the amounts of adsorbent filled in the first and second dryers 10 and 11 are equal to each other.

Thus, dry compressed air can always be supplied into the tank 4 in the closed-circuit type air suspension system, in which compressed air delivered from the compressor 3 is mainly supplied into the tank 4. It should be noted that the water adsorption capacity of the first dryer 10 can be made higher than that of the second dryer 11 also, for example, by a method in which adsorbents of equal material are used, and in which the amount of adsorbent 10F filled in the first dryer 10 is made greater than that in the second dryer 11.

The first orifice 12A and a first check valve 12B are provided in parallel in the middle of the first passage 6 between the first dryer 10 and the first supply-discharge switching valve 18 (described later). The first orifice 12A restricts the flow rate of air flowing through the first passage 6 from the tank 4 to the junction 8. Air flowing through the first passage 6 from the junction 8 to the tank 4 passes through the first check valve 12B and is therefore not restricted in flow rate.

The second orifice 13 and the second check valve 14 are provided in parallel in the middle of the second passage 7 between the second dryer 11 and the second supply-discharge switching valve 19 (described later). The second orifice 13 restricts the flow rate of air flowing through the second passage 7 from the air suspensions 1 and 2 to the junction 8. Air flowing through the second passage 7 from the junction 8 to the air suspensions 1 and 2 passes through the second check valve 14 and is therefore not restricted in flow rate.

An air discharge passage 15 releases air discharged from the air suspensions 1 and 2 or the tank 4 into the atmosphere. One end of the air discharge passage 15 is connected through a junction 16 to a halfway point of the common passage 9 of the first and second passages 6 and 7. That is, one end of the air discharge passage 15 is connected to a section of the first passage 6 between the compressor 3 and the first dryer 10 and also connected to a section of the second passage 7 between the compressor 3 and the second dryer 11. On the other hand, the other end of the air discharge passage 15 is open to the atmosphere.

The air discharge passage 15, when lowering the vehicle height, for example, discharges the air from the air chambers 1C and 2C of the air suspensions 1 and 2 into the atmosphere. Further, the air discharge passage 15, when regenerating the first dryer 10, for example, discharges the compressed air from the tank 4 into the atmosphere.

An air discharge valve 17 is provided in the middle of the air discharge passage 15. The air discharge valve 17 comprises a 2-port, 2-position electromagnetic valve having a solenoid 17A. The air discharge valve 17 is switchable between a valve closed position (a) where the air discharge valve 17 closes the air discharge passage 15, and a valve open position (b) where the air discharge valve 17 opens the air discharge passage 15. For example, when the solenoid 17A is not excited, the air discharge valve 17 holds the valve closed position (a) to close the air discharge passage 15. On the other hand, when the solenoid 17A is excited, the air discharge valve 17 is switched from the valve closed position (a) to the valve open position (b) to open the air discharge passage 15.

The first supply-discharge switching valve 18 is provided in the middle of the first passage 6 between the tank 4 and the first dryer 10. The first supply-discharge switching valve 18 comprises a 3-port, 2-position electromagnetic valve having a solenoid 18A. The first supply-discharge switching valve 18 is switchable between a supply position (c) where the first supply-discharge switching valve 18 supplies compressed air to the tank 4, and a discharge position (d) where the first supply-discharge switching valve 18 discharges compressed air from the tank 4 to the return passage 22 (described later). For example, when the solenoid 18A is not excited, the first supply-discharge switching valve 18 holds the discharge position (d) to discharge compressed air from the tank 4 to the later-described return passage 22. On the other hand, when the solenoid 18A is excited, the first supply-discharge switching valve 18 is switched from the discharge position (d) to the supply position (c) to supply compressed air delivered from the compressor 3 into the tank 4 through the first passage 6.

Between the first supply-discharge switching valve 18 and the tank 4 is provided an opening-closing valve (not shown). The opening-closing valve comprises an electromagnetic valve in the same way as suspension control valves 20 and 21 (described later). The opening-closing valve is normally closed to cut off between the tank 4 and the first supply-discharge switching valve 18. When opened, the opening-closing valve provides communication between the tank 4 and the first supply-discharge switching valve 18.

The second supply-discharge switching valve 19 is provided in the middle of the second passage 7 between the air suspensions 1 and 2 and the second dryer 11. The second supply-discharge switching valve 19 comprises a 3-port, 2-position electromagnetic valve having a solenoid 19A. The second supply-discharge switching valve 19 is switchable between a supply position (e) where the second supply-discharge switching valve 19 supplies air to the air chambers 1C and 2C of the air suspensions 1 and 2, and a discharge position (f) where the second supply-discharge switching valve 19 discharges air from the air chambers 1C and 2C of the air suspensions 1 and 2 to the return passage 22. For example, when the solenoid 19A is not excited, the second supply-discharge switching valve 19 holds the discharge position (f) to discharge air from the air chambers 1C and 2C to the return passage 22. On the other hand, when the solenoid 19A is excited, the second supply-discharge switching valve 19 is switched from the discharge position (0 to the supply position (e) to supply compressed air from the compressor 3 into the air chambers 1C and 2C through the second passage 7.

The suspension control valve 20 is provided in the middle of the branched second passage 7A between the air suspension 1 and the second supply-discharge switching valve 19. The suspension control valve 20 comprises a 2-port, 2-position electromagnetic valve having a solenoid 20A. The suspension control valve 20 is switchable between a valve open position (g) where the suspension control valve 20 opens the branched second passage 7A, and a valve closed position (h) where the suspension control valve 20 closes the branched second passage 7A. For example, when the solenoid 20A is not excited, the suspension control valve 20 holds the valve closed position (h) to close the branched second passage 7A. On the other hand, when the solenoid 20A is excited, the suspension control valve 20 is switched to the valve open position (g) to open the branched second passage 7A.

The suspension control valve 21 is provided in the middle of the branched second passage 7B between the air suspension 2 and the second supply-discharge switching valve 19. The suspension control valve 21 comprises a 2-port, 2-position electromagnetic valve having a solenoid 21A. The suspension control valve 21 is switchable between a valve open position (j) where the suspension control valve 21 opens the branched second passage 7B, and a valve closed position (k) where the suspension control valve 21 closes the branched second passage 7B. For example, when the solenoid 21A is not excited, the suspension control valve 21 holds the valve closed position (k) to close the branched second passage 7B. On the other hand, when the solenoid 21A is excited, the suspension control valve 21 is switched to the valve open position (j) to open the branched second passage 7A.

The return passage 22 connects between the first and second supply-discharge switching valves 18 and 19 and the suction port 3C of the compressor 3, which is the suction side thereof. When the first supply-discharge switching valve 18 is switched to the discharge position (d), the return passage 22 returns compressed air from the tank 4 to the suction port 3C of the compressor 3. On the other hand, when the second supply-discharge switching valve 19 is switched to the discharge position (f), the return passage 22 returns air from the air chambers 1C and 2C of the air suspensions 1 and 2 to the suction port 3C of the compressor 3.

The suction passage 23 is open at one end thereof to the atmosphere and connected at the other end thereof to the return passage 22 and the suction side of the compressor 3. The one end of the suction passage 23 constitutes an intake port 23A. The intake port 23A is provided with an intake filter 24. The intake filter 24 removes dust and the like from ambient air sucked into the compressor body 3A.

An intake check valve 25 is provided in the middle of the suction passage 23. The intake check valve 25 opens the suction passage 23 when the pressure at the suction port 3C side of the compressor 3 becomes not higher than the atmospheric pressure. The intake check valve 25 allows flow of air (ambient air) sucked into the compressor 3 from the intake port 23A of the suction passage 23 but prevents reverse air flow.

The following is an explanation of the operation of the closed-circuit type air suspension system according to the embodiment having the above-described structure.

Figure 3:
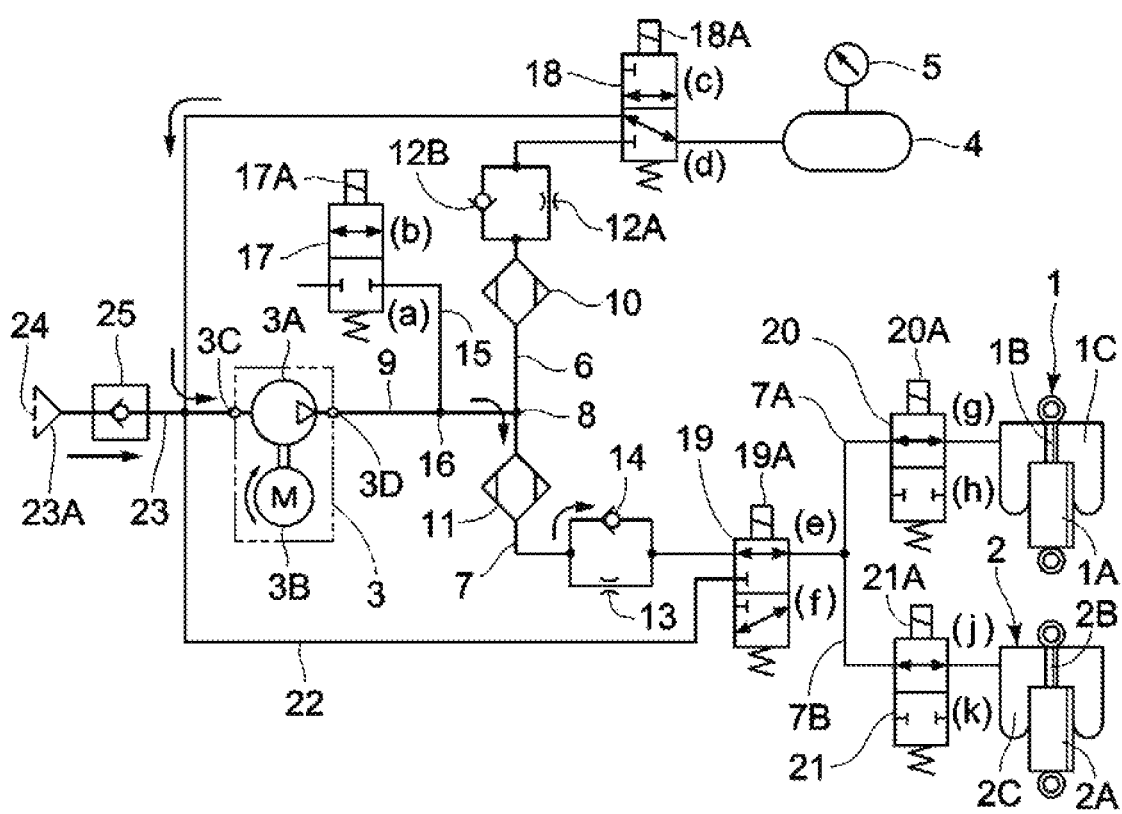
FIG. 3 is a circuit configuration diagram showing the way in which the vehicle height is raised.

First, an explanation will be made of an operation carried out to raise the vehicle height in a state where compressed air has been sufficiently filled in the tank 4. In this case, as shown in FIG. 3, the air discharge valve 17 is held in the valve closed position (a), and the first supply-discharge switching valve 18 is held in the discharge position (d). In addition, the second supply-discharge switching valve 19 is switched to the supply position (e), and the suspension control valves 20 and 21 are switched to the valve open positions (g) and (j), respectively. In this state, the compressor 3 is activated to operate.

Consequently, compressed air in the tank 4 is sucked into the compressor 3 through the first supply-discharge switching valve 18 and the return passage 22 and compressed by the compressor body 3A before being delivered to the common passage 9. The compressed air is supplied into the air chambers 1C and 2C of the air suspensions 1 and 2 through the second passage 7, the second dryer 11, the second check valve 14, the second supply-discharge switching valve 19, and the suspension control valves 20 and 21. As a result, the air suspensions 1 and 2 are extended, thereby enabling the vehicle height to be raised.

It should be noted here that the closed-circuit type air suspension system has the possibility that, when the vehicle is not used for a long period of time, for example, air leakage may occur in the system, resulting in a shortage of compressed air in the tank 4. In this regard, this embodiment can compensate for the shortage of compressed air in the tank 4 with ambient air when the vehicle height is to be raised. The following is an explanation of an operation therefor.

That is, if the compressed air in the tank 4 runs short during the operation of raising the vehicle height shown in FIG. 3, the pressure in the tank 4, which is detected by the pressure gauge 5, lowers, and the pressure at the suction port 3C side of the compressor 3 lowers to a level not higher than the atmospheric pressure. As a result, the intake check valve 25 opens the suction passage 23. Consequently, ambient air is sucked into the compressor 3 through the intake port 23A of the suction passage 23 and compressed by the compressor body 3A. Thus, compressed air is generated. The compressed air is delivered to the common passage 9 and thereafter supplied into the air chambers 1C and 2C of the air suspensions 1 and 2 through the second passage 7, the second dryer 11, the second check valve 14, the second supply-discharge switching valve 19, and the suspension control valves 20 and 21.

In this case, the compressed air, which is ambient air compressed by the compressor 3, contains water. The water, however, can be adsorbed by the second dryer 11, which is provided in the middle of the second passage 7. As a result, the compressed air delivered from the compressor 3 can be supplied into the air chambers 1C and 2C of the air suspensions 1 and 2 in a state of having been dried by the second dryer 11.

Accordingly, it is possible to eliminate the need for an operation to stop the supply of compressed air into the air suspension and to fill compressed air into the tank when the compressed air in the tank runs short during raising the vehicle height, which has heretofore been required in the closed-circuit type air suspension system according to the conventional technique, for example.

Thus, according to the air suspension system of this embodiment, even when the compressed air in the tank 4 runs short during a vehicle height raising operation, it is possible to generate compressed air by compressing ambient air with the compressor 3 and to supply the compressed air to the air chambers 1C and 2C of the air suspensions 1 and 2 in a state of having been dried by the second dryer 11. Consequently, it is possible to continuously supply compressed air to the air chambers 1C and 2C of the air suspensions 1 and 2 and hence possible to reduce the time required for vehicle height adjustment.

Moreover, when the amount of air in the air suspension system is zero, a conventional system operates as follows. The compressor 3 sucks in ambient air and temporarily fills compressed air in the tank 4. Thereafter, air is supplied to the air suspensions 1 and 2 by using the compressed air in the tank 4. In contrast, this embodiment is configured to supply air to the air suspensions 1 and 2 first and to supply compressed air to the tank 4 after the vehicle height has reached a target. With this arrangement, the required pressure of compressed air supplied to the tank 4 can be reduced to a level lower than in the conventional air suspension system. Accordingly, the compressor 3 can be reduced in size.

Here, if the arrangement is such that a single dryer is provided at a halfway point (between the junctions 8 and 16) of the common passage 9, water in compressed air to be supplied to the tank 4 and water in compressed air to be supplied to the air suspensions 1 and 2 can be adsorbed by using the single dryer. With this arrangement, however, the pressure in the single dryer reduces when compressed air is filled into the tank 4 and thereafter the compressed air in the tank 4 is sucked and supplied to the air suspensions 1 and 2 by the compressor 3, for example. That is, the pressure in the single dryer reduces from the pressure at which compressed air is filled into the tank 4 to the pressure in the air chambers 1C and 2C of the air suspensions 1 and 2. If the pressure in the single dryer reduces in this way, part of water adsorbed in the adsorbent in the dryer is released. As a result, air containing water released from the dryer may be supplied to the air suspensions 1 and 2.

In contrast to the above, according to this embodiment, the first dryer 10 is provided in the first passage 6, which is connected to the tank 4, and the second dryer 11, which is separate from the first dryer 10, is provided in the second passage 7, which is connected to the air suspensions 1 and 2. Thus, compressed air to be supplied to the tank 4 can be dried by the first dryer 10, and compressed air to be supplied directly to the air suspensions 1 and 2 can be dried by the second dryer 11.

As a result of supplying compressed air generated by the compressor 3 directly to the air chambers 1C and 2C of the air suspensions 1 and 2, the vehicle height is raised to a proper value. After the vehicle height has been raised to the proper value, compressed air generated by the compressor 3 is filled into the tank 4.

Figure 4:
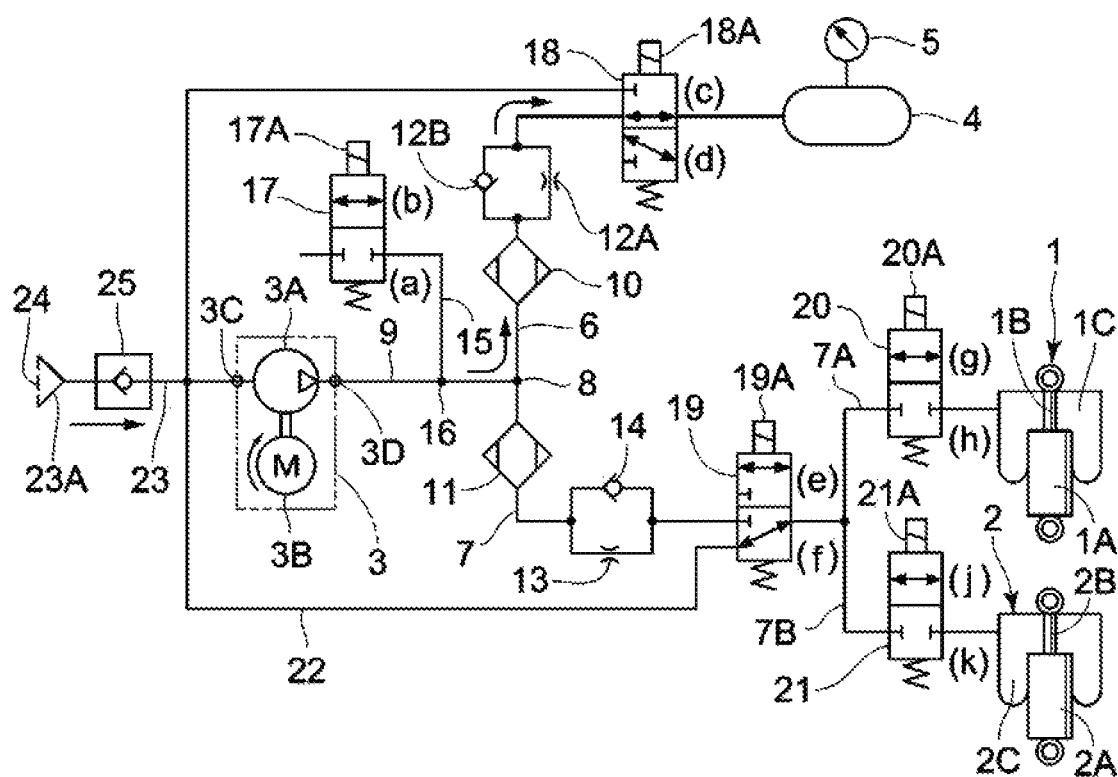
FIG. 4 is a circuit configuration diagram showing the way in which ambient air is compressed and filled into a tank.
Figure 5:
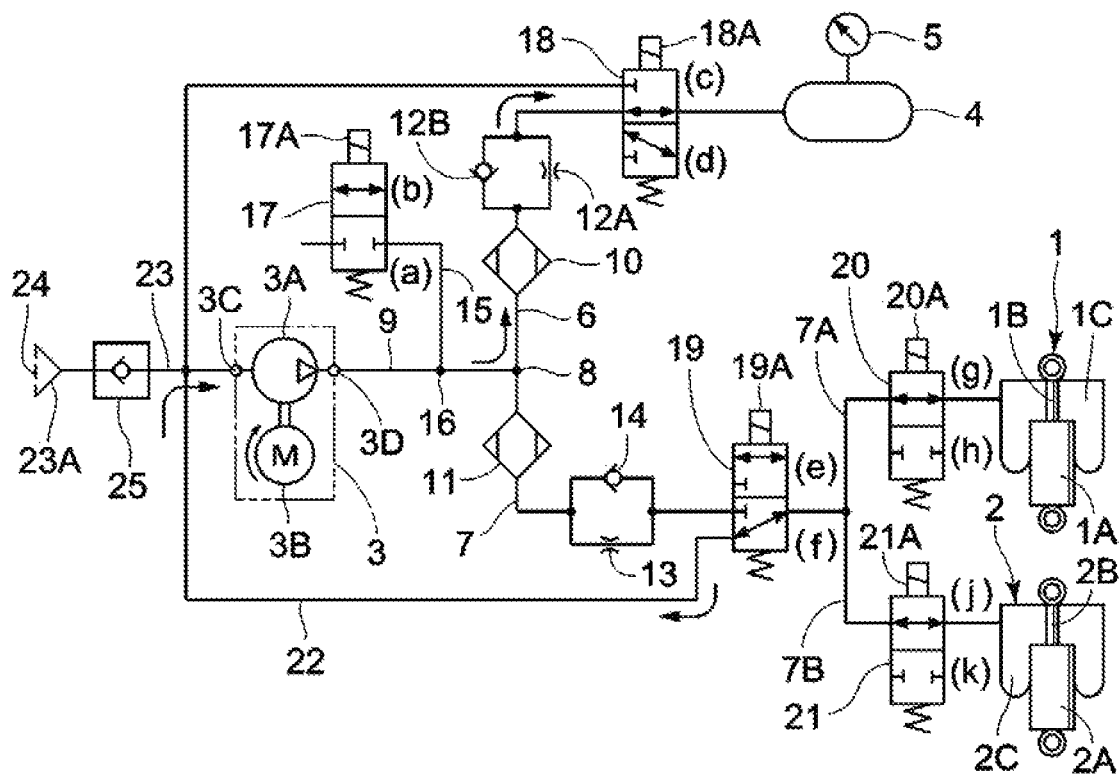
FIG. 5 is a circuit configuration diagram showing the way in which the vehicle height is lowered.

In this case, as shown in FIG. 4, the air discharge valve 17 is held in the valve closed position (a), and the first supply-discharge switching valve 18 is switched to the supply position (c). In addition, the second supply-discharge switching valve 19 holds the discharge position (f), and the suspension control valves 20 and 21 hold the valve closed positions (h) and (k), respectively. When the compressor 3 is activated to operate in this state, the pressure in the return passage 22 lowers to a level not higher than the atmospheric pressure. Consequently, the intake check valve 25 opens the suction passage 23.

Thus, ambient air is sucked into the compressor 3 through the intake port 23A of the suction passage 23 and compressed by the compressor body 3A to thereby generate compressed air. The compressed air is delivered to the common passage 9 and thereafter supplied into the tank 4 through the first passage 6, the first dryer 10, the first check valve 12B, and the first supply-discharge switching valve 18.

In this case, the compressed air, which is ambient air compressed by the compressor 3, contains water. The water, however, is adsorbed by the first dryer 10, which is provided in the middle of the first passage 6. As a result, the compressed air delivered from the compressor 3 is filled into the tank 4 in a state of having been dried by the first dryer 10. When the pressure in the tank 4 has increased to a regulation pressure, the compressor 3 is stopped. Thus, the tank 4 is filled therein with a sufficient amount of compressed air.

The following is an explanation of the operation of lowering the vehicle height. In this case, as shown in FIG.

5, the air discharge valve 17 is held in the valve closed position (a), and the second supply-discharge switching valve 19 is held in the discharge position (f). In addition, the first supply-discharge switching valve 18 is switched to the supply position (c), and the suspension control valves 20 and 21 are switched to the valve open positions (g) and (j), respectively. In this state, the compressor 3 is activated to operate.

Consequently, the air in the air chambers 1C and 2C of the air suspensions 1 and 2 is sucked into the compressor 3 through the suspension control valves 20 and 21, the second supply-discharge switching valve 19, and the return passage 22. Then, compressed air compressed by the compressor body 3A is delivered to the common passage 9 from the delivery port 3D of the compressor 3. The compressed air is supplied into the tank 4 through the first passage 6, the first dryer 10, the first check valve 12B, and the first supply-discharge switching valve 18. As a result, air is discharged from the air chambers 1C and 2C of the air suspensions 1 and 2, and thus the air suspensions 1 and 2 are contracted, thereby enabling the vehicle height to be lowered.

Figure 6:
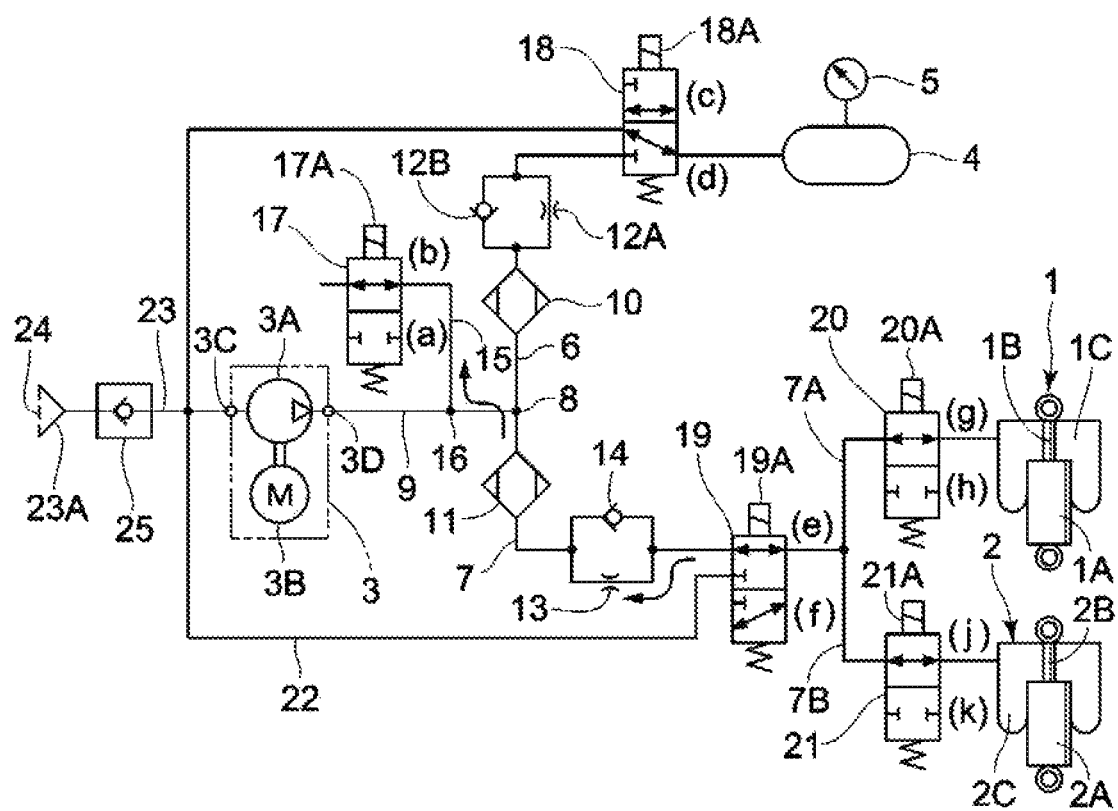
FIG. 6 is a circuit configuration diagram showing the way in which the vehicle height is lowered rapidly.

The following is an explanation of the operation of rapidly lowering the vehicle height. In this case, as shown in FIG. 6, the air discharge valve 17 is switched to the valve open position (b), and the first supply-discharge switching valve 18 is held in the discharge position (d). In addition, the second supply-discharge switching valve 19 is switched to the supply position (e), and the suspension control valves 20 and 21 are switched to the valve open positions (g) and (j), respectively.

Thus, air in the air chambers 1C and 2C of the air suspensions 1 and 2 is discharged into the atmosphere through the suspension control valves 20 and 21, the second supply-discharge switching valve 19, the second passage 7, the second orifice 13, the second dryer 11, the air discharge passage 15, and the air discharge valve 17. As a result, air is rapidly discharged from the air chambers 1C and 2C of the air suspensions 1 and 2, and thus the air suspensions 1 and 2 are contracted, thereby enabling the vehicle height to be lowered rapidly.

When the vehicle height is to be rapidly lowered, dry air discharged from the air chambers 1C and 2C of the air suspensions 1 and 2 flows to the air discharge passage 15 after passing through the second dryer 11. Consequently, water can be removed from the adsorbent filled in the second dryer 11, so that the second dryer 11 can be regenerated. In this case, the capacity of the tank 4 is, generally, smaller than that of the air chambers 1C and 2C; therefore, the pressure of air filled in the air chambers 1C and 2C is lower than the pressure of air filled in the tank 4. Accordingly, air that is discharged from the air chambers 1C and 2C into the atmosphere through the air discharge passage 15 passes through the second dryer 11 at a fixed pressure. As a result, the adsorbent filled in the second dryer 11 is dried efficiently. Regarding the discharge of air from the air chambers 1C and 2C, however, it is necessary to increase the vehicle height adjusting speed and hence necessary to increase the diameter of the second orifice 13. Accordingly, in selection of an adsorbent, more importance is attached to regeneratability than to adsorbability.

Figure 7:
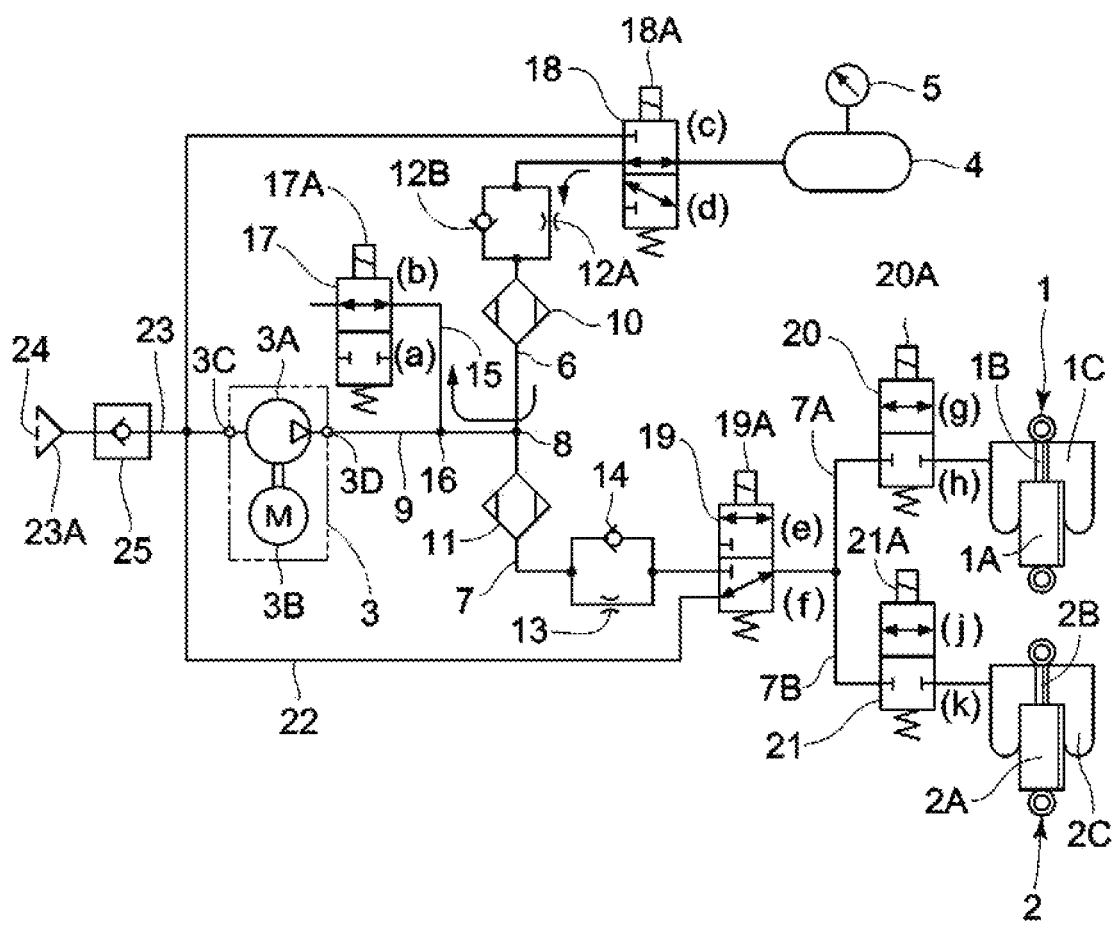
FIG. 7 is a circuit configuration diagram showing the way in which the first dryer is regenerated.

The following is an explanation of the operation of regenerating the first dryer 10. In this case, as shown in FIG. 7, the air discharge valve 17 is switched to the valve open position (b), and the first supply-discharge switching valve 18 is switched to the supply position (c). In addition, the second supply-discharge switching valve 19 is held in the discharge position (f), and the suspension control valves 20 and 21 are held in the valve closed positions (h) and (k), respectively.

Consequently, dry compressed air filled in the tank 4 is discharged into the atmosphere through the first passage 6, the first supply-discharge switching valve 18, the first orifice 12A, the first dryer 10, the common passage 9, the air discharge passage 15, and the air discharge valve 17. As a result, the adsorbent 10F filled in the first dryer 10 is dried by having water removed therefrom by the discharged air, thereby enabling the first dryer 10 to be regenerated. In this case, the time required for discharging air need not be reduced; therefore, the regeneration efficiency can be increased by reducing the diameter of the first orifice 12A. In addition, because the regeneration efficiency can be increased through the first orifice 12A, the adsorbent 10F can be selected with more importance attached to adsorbability than to regeneratability.

Thus, the air suspension system according to this embodiment has the first dryer 10 provided in the middle of the first passage 6, which connects between the delivery side of the compressor 3 and the tank 4, to dry air flowing through the first passage 6. In addition, the air suspension system has the second dryer 11 provided in the middle of the second passage 7, which connects between the delivery side of the compressor 3 and the air suspensions 1 and 2, to dry air flowing through the second passage 7. Accordingly, compressed air generated from ambient air sucked in by the compressor 3 can be dried by the second dryer 11 and supplied directly into the air chambers 1C and 2C of the air suspensions 1 and 2. It is therefore possible to perform vehicle height adjustment rapidly even when compressed air in the tank 4 runs short during vehicle height adjustment in the closed-circuit type air suspension system, and hence possible to reduce the time required for vehicle height adjustment.

Moreover, according to this embodiment, when the compressed air in the tank 4 runs short, compressed air delivered from the compressor 3 can be supplied directly into the air chambers 1C and 2C of the air suspensions 1 and 2. Therefore, compressed air required in the air suspension system need not be filled only in the tank 4. Accordingly, it is possible to reduce the maximum pressure of compressed air filled in the tank 4 and to reduce the delivery pressure of the compressor 3. As a result, the compressor 3 can be reduced in size, and the overall cost of the system can be reduced by using a low-cost compressor 3.

Further, according to this embodiment, one end of the air discharge passage 15 is connected to a section of the first passage 6 between the delivery side of the compressor 3 and the first dryer 10 and to a section of the second passage 7 between the delivery side of the compressor 3 and the second dryer 11, and the other end of the air discharge passage 15 is open to the atmosphere.

Therefore, when the vehicle height is to be lowered rapidly, as shown in FIG. 6, dry air discharged from the air chambers 1C and 2C of the air suspensions 1 and 2 flows to the air discharge passage 15 after passing through the second dryer 11. In this case, the pressure of air filled in the air chambers 1C and 2C is low and substantially constant; therefore, air discharged from the air chambers 1C and 2C to the atmosphere through the air discharge passage 15 passes through the second dryer 11. Consequently, it is possible to satisfactorily dry the adsorbent filled in the second dryer 11 and to regenerate the second dryer 11 efficiently.

Meanwhile, when the first dryer 10 is to be regenerated, as shown in FIG. 7, compressed air in the tank 4 is discharged into the atmosphere through the first passage 6, the first supply-discharge switching valve 18, the first orifice 12A, the first dryer 10, the common passage 9, the air discharge passage 15, and the air discharge valve 17. Consequently, it is possible to dry the adsorbent 10F filled in the first dryer 10 and to regenerate the first dryer 10.

Examples of air suspension systems based on the foregoing embodiment include those according to the following aspects.

An air suspension system according to a first aspect includes the following constituent elements: an air suspension interposed between a vehicle body and an axle to perform vehicle height adjustment in response to supply and discharge of air; a compressor compressing air; a tank storing air compressed by the compressor; a first passage connecting between the delivery side of the compressor and the tank; a second passage connecting between the delivery side of the compressor and the air suspension; a first dryer drying air flowing through the first passage; and a second dryer drying air flowing through the second passage.

According to a second aspect, the air suspension system in the first aspect has a first orifice and a first check valve provided in parallel in the middle of the first passage. The first orifice restricts the flow rate of air flowing through the first passage. The first check valve allows flow of air from the compressor to the tank but prevents reverse air flow. The air suspension system further has a second orifice and a second check valve provided in parallel in the middle of the second passage. The second orifice restricts the flow rate of air flowing through the second passage. The second check valve allows flow of air from the compressor to the air suspension but prevents reverse air flow.

According to a third aspect, the first dryer in the first or second aspect is higher than the second dryer in adsorption capacity to adsorb water from air.

According to a fourth aspect, the first dryer and the second dryer in the first, second or third aspect have respective adsorbents adsorbing water from air, the adsorbent of the first dryer being higher in adsorbability than the adsorbent of the second dryer.

According to a fifth aspect, the air suspension system in the first, second, third or fourth aspect has an air discharge passage releasing air discharged from the air suspension into the atmosphere, and an air discharge valve provided in the middle of the air discharge passage to open and close the air discharge passage. The air discharge passage is connected at one end thereof to a section of the first passage between the delivery side of the compressor and the first dryer and to a section of the second passage between the delivery side of the compressor and the second dryer, the air discharge passage being open to the atmosphere at the other end thereof.

According to a sixth aspect, the air suspension system in the first, second, third, fourth or fifth aspect includes the following constituent elements: a first supply-discharge switching valve disposed in the middle of the first passage between the tank and the first dryer, the first supply-discharge switching valve being switchable between a supply position where the first supply-discharge switching valve supplies air to the tank, and a discharge position where the first supply-discharge switching valve discharges air from the tank; a second supply-discharge switching valve disposed in the middle of the second passage between the air suspension and the second dryer, the second supply-discharge switching valve being switchable between a supply position where the second supply-discharge switching valve supplies air to the air suspension, and a discharge position where the second supply-discharge switching valve discharges air from the air suspension; a return passage connecting between the first and second supply-discharge switching valves and the suction side of the compressor to return air discharged from the tank or the air suspension to the suction side of the compressor; a suction passage open at one end thereof to the atmosphere and connected at the other end thereof to the return passage and the suction side of the compressor; and an intake check valve disposed in the middle of the suction passage to open the suction passage when the pressure at the suction side of the compressor lowers.

The embodiment illustrates an example in which, when the vehicle height is to be raised, the compressor 3 is activated to operate in a state where, as shown in FIG. 3, the first supply-discharge switching valve 18 is placed in the discharge position (d), and the second supply-discharge switching valve 19 is placed in the supply position (e), so that compressed air in the tank 4 is supplied into the air chambers 1C and 2C of the air suspensions 1 and 2 through the compressor 3.

The present invention is, however, not limited to the above but may be configured, for example, as follows. With the compressor 3 stopped, the first and second supply-discharge switching valves 18 and 19 are placed in the discharge positions (d) and (f), respectively, and the suspension control valves 20 and 21 are placed in the valve open positions (g) and (j), respectively, thereby supplying compressed air in the tank 4 into the air chambers 1C and 2C of the air suspensions 1 and 2 without using the compressor 3. With this configuration also, when the compressed air in the tank 4 runs short, compressed air can be generated by sucking in ambient air through the compressor 3 and supplied directly into the air chambers 1C and 2C of the air suspensions 1 and 2 after drying the compressed air through the second dryer 11.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the technical scope of the present invention. The foregoing embodiments may be combined at will.

The present application claims priority to Japanese Patent Application No. 2016-147384 filed on Jul. 27, 2016. The entire disclosure of Japanese Patent Application No. 2016-147384 filed on Jul. 27, 2016 including specification, claims, drawings and summary is incorporated herein by reference in its entirety.

REFERENCE SIGNS LIST 1, 2: air suspension; 3: compressor; 4: tank; 6: first passage; 7: second passage; 10: first dryer; 11: second dryer; 12A: first orifice; 12B: first check valve; 13: second orifice; 14: second check valve; 15: air discharge passage; 17: air discharge valve; 18: first supply-discharge switching valve; 19: second supply-discharge switching valve; 22: return passage; 23: suction passage; 25: intake check valve.

The invention claimed is:

1. An air suspension system comprising:
   an air suspension interposed between a vehicle body and an axle to perform vehicle height adjustment in response to supply and discharge of air;
   a compressor configured to compress air;
   a tank configured to store air compressed by the compressor;
   a first passage connecting between a delivery side of the compressor and the tank;
   a second passage connecting between the delivery side of the compressor and the air suspension;
   a first dryer configured to dry air flowing through the first passage or configured to be regenerated by air flowing through the first passage; and
   a second dryer configured to dry air flowing through the second passage or configured to be regenerated by air flowing through the second passage, wherein the first dryer is higher than the second dryer in adsorption capacity to adsorb water from air.

2. The air suspension system of claim 1, further comprising:
   a first orifice and a first check valve provided in parallel in middle of the first passage; the first orifice that restricts a flow rate of air flowing through the first passage, the first check valve that allows flow of air from the compressor to the tank and that prevents the reverse of the air flow; and
   a second orifice and a second check valve provided in parallel in middle of the second passage, the second orifice that restricts a flow rate of air flowing through the second passage, the second check valve that allows flow of air from the compressor to the air suspension and that prevents the reverse of the air flow.

3. The air suspension system of claim 2, further comprising:
   an air discharge passage that releases air discharged from the air suspension into atmosphere; and
   an air discharge valve provided in middle of the air discharge passage to open and close the air discharge passage;
   wherein the air discharge passage is connected at one end thereof to a section of the first passage between the delivery side of the compressor and the first dryer and to a section of the second passage between the delivery side of the compressor and the second dryer, the air discharge passage being open to atmosphere at another end thereof.

4. The air suspension system of claim 2, further comprising:
   a first supply-discharge switching valve disposed in middle of the first passage between the tank and the first dryer, the first supply-discharge switching valve being switchable between a supply position where the first supply-discharge switching valve supplies air to the tank, and a discharge position where the first supply-discharge switching valve discharges air from the tank;
   a second supply-discharge switching valve disposed in middle of the second passage between the air suspension and the second dryer, the second supply-discharge switching valve being switchable between a supply position where the second supply-discharge switching valve supplies air to the air suspension, and a discharge position where the second supply-discharge switching valve discharges air from the air suspension;
   a return passage connecting between the first and second supply-discharge switching valves and a suction side of the compressor to return air discharged from the tank or the air suspension to the suction side of the compressor;
   a suction passage that opens at one end thereof to the atmosphere and connected at an other end thereof to the return passage and the suction side of the compressor; and
   an intake check valve disposed in middle of the suction passage to open the suction passage when a pressure at the suction side of the compressor lowers.

5. The air suspension system of claim 1, wherein the first dryer and the second dryer have respective adsorbents capable of adsorbing water from air, the adsorbent of the first dryer being higher in adsorbability than the adsorbent of the second dryer.

6. The air suspension system of claim 5, further comprising:
   an air discharge passage that releases air discharged from the air suspension into atmosphere; and
   an air discharge valve provided in middle of the air discharge passage to open and close the air discharge passage;
   wherein the air discharge passage is connected at one end thereof to a section of the first passage between the delivery side of the compressor and the first dryer and to a section of the second passage between the delivery side of the compressor and the second dryer, the air discharge passage being open to atmosphere at another end thereof.

7. The air suspension system of claim 5, further comprising:
   a first supply-discharge switching valve disposed in middle of the first passage between the tank and the first dryer, the first supply-discharge switching valve being switchable between a supply position where the first supply-discharge switching valve supplies air to the tank, and a discharge position where the first supply-discharge switching valve discharges air from the tank;
   a second supply-discharge switching valve disposed in middle of the second passage between the air suspension and the second dryer, the second supply-discharge switching valve being switchable between a supply position where the second supply-discharge switching valve supplies air to the air suspension, and a discharge position where the second supply-discharge switching valve discharges air from the air suspension;
   a return passage connecting between the first and second supply-discharge switching valves and a suction side of the compressor to return air discharged from the tank or the air suspension to the suction side of the compressor;
   a suction passage that opens at one end thereof to the atmosphere and connected at an other end thereof to the return passage and the suction side of the compressor; and
   an intake check valve disposed in middle of the suction passage to open the suction passage when a pressure at the suction side of the compressor lowers.

8. The air suspension system of claim 1, further comprising:
   an air discharge passage that releases air discharged from the air suspension into atmosphere; and
   an air discharge valve provided in middle of the air discharge passage to open and close the air discharge passage;
   wherein the air discharge passage is connected at one end thereof to a section of the first passage between the delivery side of the compressor and the first dryer and to a section of the second passage between the delivery side of the compressor and the second dryer, the air discharge passage being open to atmosphere at another end thereof.

9. The air suspension system of claim 1, further comprising:
a first supply-discharge switching valve disposed in middle of the first passage between the tank and the first dryer, the first supply-discharge switching valve being switchable between a supply position where the first supply-discharge switching valve supplies air to the tank, and a discharge position where the first supply-discharge switching valve discharges air from the tank;
a second supply-discharge switching valve disposed in middle of the second passage between the air suspension and the second dryer, the second supply-discharge switching valve being switchable between a supply position where the second supply-discharge switching valve supplies air to the air suspension, and a discharge position where the second supply-discharge switching valve discharges air from the air suspension;
a return passage connecting between the first and second supply-discharge switching valves and a suction side of the compressor to return air discharged from the tank or the air suspension to the suction side of the compressor;
a suction passage that opens at one end thereof to the atmosphere and connected at an other end thereof to the return passage and the suction side of the compressor; and
an intake check valve disposed in middle of the suction passage to open the suction passage when a pressure at the suction side of the compressor lowers.

10. An air suspension system comprising:
an air suspension interposed between a vehicle body and an axle to perform vehicle height adjustment in response to supply and discharge of air;
a compressor configured to compress air;
a tank configured to store air compressed by the compressor;
a first passage connecting between a delivery side of the compressor and the tank;
a second passage connecting between the delivery side of the compressor and the air suspension;
a first dryer configured to dry air flowing through the first passage and configured to be regenerated by air flowing through the first passage; and
a second dryer configured to dry air flowing through the second passage and/or configured to be regenerated by air flowing through the second passage.

* * * * *